United States Patent [19]

Ichimura et al.

[11] Patent Number: 5,329,353
[45] Date of Patent: Jul. 12, 1994

[54] HIGH SENSITIVE MULTI-WAVELENGTH SPECTRAL ANALYZER

[75] Inventors: Tsutomu Ichimura; Toshiyuki Nogoshi; Fumio Inaba, all of Sendai, Japan

[73] Assignee: Research Development Corp. of Japan, Tokyo, Japan

[21] Appl. No.: 832,475

[22] Filed: Feb. 7, 1992

[30] Foreign Application Priority Data

Feb. 7, 1991 [JP] Japan .................. 3-015628

[51] Int. Cl.[5] ............................... G01J 3/28
[52] U.S. Cl. .......................... 356/328; 356/318; 356/301
[58] Field of Search ........ 356/318, 326, 328, 330–334, 356/236, 301; 359/571

[56] References Cited

U.S. PATENT DOCUMENTS

| | | | |
|---|---|---|---|
| 3,600,093 | 8/1971 | McMahon | 356/334 |
| 4,076,421 | 2/1978 | Kishner | 356/236 |
| 4,973,159 | 11/1990 | Sohm et al. | 356/328 |

FOREIGN PATENT DOCUMENTS 2758141  6/1979  Fed. Rep. of Germany ...... 356/328

Primary Examiner—Vincent P. McGraw
Assistant Examiner—K. P. Hantis
Attorney, Agent, or Firm—Armstrong, Westerman, Hattori, McLeland & Naughton

[57] ABSTRACT

A compact, high sensitive, multi-wavelength spectral analyzer capable of simultaneously obtaining a spectral distribution of extremely weak radiation such as bioluminescence, chemiluminescence, extremely weak fluorescence caused by excitation light, Raman scattered light, etc. with an extremely high luminosity and without wavelength scanning. The spectral analyzer comprises a spectroscope and a high sensitive one- or two-dimensional photodetector. The spectroscope includes an entrance slit, a collimator lens of high luminosity disposed such that a focal point of the collimator lens is coincident with the entrance slit to convert light emerging therefrom into parallel rays, a reflection diffraction grating that diffracts the parallel rays from the collimator lens to produce spectra, and an imaging lens that focuses the parallel rays diffracted by the reflection diffraction grating on an image plane thereof to form a spectral image. The photodetector is disposed on the image plane of the imaging lens.

12 Claims, 15 Drawing Sheets

Incident light

000
HIGH SENSITIVE MULTI-WAVELENGTH SPECTRAL ANALYZER

BACKGROUND OF THE INVENTION

The present invention relates to a high sensitive multi-wavelength spectral analyzer which is capable of spectral analysis of extremely weak radiation over a spectral range of from the visible region to the infrared region, for example, bioluminescence, chemiluminescence, extremely weak fluorescence caused by excitation light, Raman scattered light, etc.

Recently, attention has been attracted to extremely weak radiation such as bioluminescence, chemiluminescence, extremely weak fluorescence caused by excitation light, Raman scattered light, etc. For spectral analysis of such extremely weak radiation, it is desirable to carry out measurement with minimal loss of light. For this purpose, it is preferable to use an optical system of high luminosity which enables a large exit solid angle to be obtained so as to increase the utilization of light flux (i.e., throughput), and arrange a detection system having the simultaneous photometry (i.e., multiplex) advantage that a multiplicity of wavelengths are measured at a time. More specifically, it is necessary to employ optical systems of high luminosity for both collimator and condenser systems and use a high sensitive multi-wavelength spectral analyzer arranged by adopting the design idea of a polychromator that is capable of multi-wavelength spectral analysis by simultaneously measuring a multiplicity of wavelengths in an observation wavelength region without performing wavelength scanning. However, there has heretofore been no spectral analyzer that meets the requirements. The conventional spectroscope employing a diffraction grating is basically a monochromator, and therefore it needs an entrance slit and an exit slit indispensably and hence necessitates wavelength scanning. During the wavelength scanning, rays of light other than the light that is taken out through the exit slit are discarded. Thus, this type of conventional spectroscope has no multiplex advantage.

In addition, the prior art is not designed so that a one- or two-dimensional light distribution detector for detecting a spectral distribution is disposed at the exit plane. Accordingly, when the exit slit is merely replaced with a detector, the wavelength region within which simultaneous photometry can be effected is narrow, and there are also problems concerning focal plane, aberration and so forth. Further, since both the collimator and condenser systems employ reflecting mirrors in an off-axis state, the spectral line image is curved owing to the off-axis arrangement and aberration, so that the f-number cannot be made very small. Thus, there has been a limitation on the luminosity of the spectroscope; no spectroscope of f3 or less has been put to practical use.

A spectroscope with f1 has recently been developed which employs a parabolic mirror as a reflecting mirror used in the prior art. However, since the converging mirror (parabolic mirror) is employed in an off-axis state, the spectral line image is curved, so that it is difficult to obtain an accurate spectral distribution with a one- or two-dimensional light distribution detector. In addition, since the detecting surface of the detector must be cooled in order to realize high-sensitivity measurement, a relatively thick vacuum chamber for heat insulation needs to be disposed in front of the photoelectric surface of the one- or two-dimensional photodetector, as a means for preventing moisture condensation on the detecting surface, so that it is necessary to increase the focal length of the converging parabolic mirror.

Further, a polychromator that employs a concave diffraction grating and a detector array has been put on sale recently. However, since there are limitations on the diameter and curvature radius of the concave diffraction grating, the light-gathering capability is limited, so that no adequate luminosity can be obtained.

In the meantime, it has been proposed to utilize a static interference spectroscopy employing a triangle common path interferometer, a quadrangle common path interferometer, a birefringent polarization interferometer, etc. for spectral analysis of extremely weak radiation. However, examination of this prior art presents a question about the statement that these interferometers have higher luminosity than that of conventional spectroscopes because there is no limitation on the area of the surface of a luminous sample. In addition, although these interferometers have an optical system which provides a higher luminosity than that of the conventional spectroscopes, the high luminosity is not characteristic of the interferometer, but it is owing to the use of lenses of higher luminosity in places of mirrors. Since the width of the detector array is smaller than that of the diffraction grating in the present state of art, the size of these widths determines the resolving power of each individual spectroscopic system, and therefore the resolving power of the static interference spectroscopy is inferior to that of the spectroscopes. With regard to energy, in the spectroscopes if the entrance slit width is enlarged, the resolving power lowers, but energy can be increased instead, whereas, in the static interference spectroscopy the contract deteriorates, resulting in no advantageous effect.

Thus, with the conventional spectroscopes or spectroscopic methods, it has heretofore been difficult to effect spectral analysis of extremely weak radiation such as bioluminescence, chemiluminescence, extremely weak fluorescence caused by excitation light, Raman scattered light, etc., particularly difficult to obtain simultaneously a spectral distribution of a multiplicity of wavelengths.

SUMMARY OF THE INVENTION

Accordingly, it is an object of the present invention to overcome the above-described disadvantages of the conventional spectroscopes and spectroscopic methods and provide a compact, high sensitive, multi-wavelength spectral analyzer, based on the design idea of polychromator, which is capable of simultaneously obtaining a spectral distribution of extremely weak radiation such as bioluminescence, chemiluminescence, extremely weak fluorescence caused by excitation light, Raman scattered light, etc. with an extremely high luminosity and without wavelength scanning.

To this end, the present invention provides a high sensitive multi-wavelength spectral analyzer which comprises: a spectroscope including an optical system that limits incident light to a point or linear beam, a collimator lens of high luminosity disposed such that a focal point of the collimator lens is coincident with a point or linear exit end of the optical system, to convert light emerging from the exit end into parallel rays, a reflection diffraction grating that diffracts the parallel rays from the collimator lens to produce spectra, and an imaging lens that focuses the parallel rays diffracted by the reflection diffraction grating on an image plane thereof to form a spectral image; and a photon counting type or high sensitivity one- or two dimensional photodetector disposed on the image plane of the imaging lens.

It is preferable in order to prevent eclipse due to the imaging lens and realize spectral analysis of higher luminosity to dispose the imaging lens and the high sensitivity one- or two-dimensional photodetector such that the optical axis of the imaging lens is coincident with the bisecting angle of the short wavelength-side diffraction angle and the long wavelength-side diffraction angle of an observation wavelength region and the optical axis is substantially coincident with the center of the detecting surface of the one- or two-dimensional photodetector.

Incidentally, lenses with small f-numbers which are available at present are limited in the aperture diameter, and there is therefore a restriction on the combination of a collimator lens, an imaging lens, a diffraction grating and an angle of incidence to the diffraction grating. Accordingly, for spectral detection of extremely weak spontaneous emission such as bioluminescence, chemiluminescence, etc., it is desirable to employ a blazed diffraction grating as the reflection diffraction grating and a spectroscope collimator lens which has a larger aperture diameter than that of the imaging lens and to dispose these elements such that −first-order diffracted light can be taken out as a spectral image, thus minimizing the loss of incident light to a larger extent than that to which stray light is minimized. For spectral detection of extremely weak fluorescence caused by excitation light, Raman scattered light, etc., it is desirable to employ a blazed diffraction grating as the reflection diffraction grating and a spectroscope imaging lens which has a larger aperture diameter than that of the collimator lens and to dispose these elements such that +first-order diffracted light can be taken out as a spectral image, thus minimizing stray light to a larger extent than that to which the loss of incident light is minimized. However, when a holographic diffraction grating is employed to minimize stray light, there is no large difference between − and +first-order diffracted light.

The above-described spectral analyzer may be modified such that a single lens that serves as both collimator and imaging lenses is disposed parallel in front of the reflection diffraction grating so that the point or linear exit end of the optical system is disposed on a focal plane of the collimator-imaging lens, and the high sensitivity one- or two-dimensional photodetector is disposed on an image plane of the collimator-imaging lens.

As the optical system that limits incident light to a point or linear beam, a slit or a pinhole may be employed. It is also possible to employ an optical system that receives light from a sample or from a minute region or a relatively broad region of a sample image and emits light in the form of a point or linear beam.

If two or more spectroscopes, such as those described above, which are the same or different in type are disposed in a multi-stage structure for additive dispersion or subtractive dispersion to thereby control angular dispersion by using diffracted light a plurality of times, the resolving power in the additive dispersion arrangement can be further improved.

Incidentally, microspectroscopic analysis of high luminosity can be realized by converting luminescence, fluorescence or Raman scattered light from a minute point on a sample into substantially parallel rays through a first positive lens having a smaller f-number than that of the collimator lens of the spectroscope, and focusing the parallel rays onto the entrance slit of the high sensitive multi-wavelength spectral analyzer in the form of a point or linear image through a second positive lens having a smaller f-number than that of the collimator lens. In this arrangement, it is preferable to scan the spectral analysis point on the sample with respect to the front focal point of the first positive lens.

In the present invention, the optical system, which limits incident light to a point or linear beam and emits it, causes light from a sample or a sample image to enter the collimator lens as a point or linear light source, and the collimator lens forms the light from the sample or the sample image into parallel rays of high parallelism and allows all the parallel rays to enter the reflection diffraction grating. Accordingly, the reflection diffraction grating can display its resolving power to the full and effectively diffract extremely weak light to produce spectra. In addition, the collimator lens and the imaging lens need not be used in an off-axis state, so that an image of the optical system that limits incident light to a point or linear beam can be formed without curvature. Further, since the collimator lens and the imaging lens can be disposed in close proximity to the reflection diffraction grating, all the incident light can be utilized effectively for high resolution, simultaneous, multi-wavelength spectral analysis, and it is possible to realize a reduction in the overall size of the apparatus. Since lenses having an f-number as small as possible can be used as the collimator and imaging lenses, the light-gathering capability of the apparatus, which is determined by the two lenses, can be increased satisfactorily. By combining the spectroscope with a photon counting type or high sensitive one- or two-dimensional photodetector, it becomes possible to effect simultaneous multi-wavelength analysis of extremely weak radiation such as bioluminescence, chemiluminescence, extremely weak fluorescence caused by excitation light, Raman scattered light, etc. Thus, the spectral analyzer of the present invention is useful as a means for researching living organisms and trace components by use of bioluminescence, chemiluminescence, extremely weak fluorescence caused by excitation light, Raman scattered light, etc.

Still other objects and advantages of the invention will in part be obvious and will in part be apparent from the specification.

The invention accordingly comprises the features of construction, combinations of elements, and arrangements of parts which will be exemplified in the construction hereinafter set forth, and the scope of the invention will be indicated in the claims.

DESCRIPTION OF THE PREFERRED EMBODIMENTS

Figure 1:
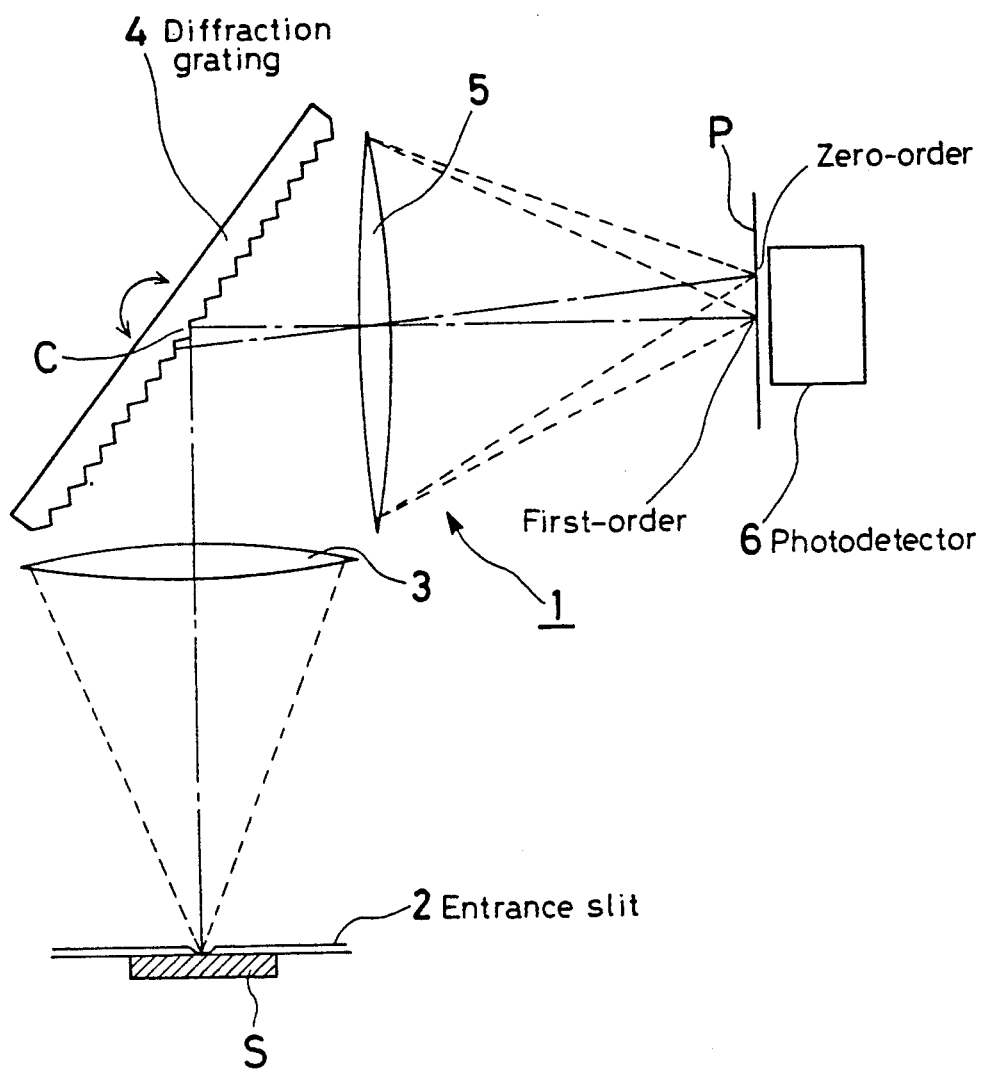
FIG. 1 shows the optical arrangement of one embodiment of the high sensitive multi-wavelength spectral analyzer according to the present invention.

For spectral analysis of extremely weak radiation such as bioluminescence, chemiluminescence, extremely weak fluorescence caused by excitation light, Raman scattered light, etc., it is necessary to select an optical system so that light from an emission point on a sample enters a spectroscopic system as much as possible. In other words, it is necessary to maximize the solid angle with which the optical system accepts light from the extremely weak light emission point. In the meantime, a spectral line image that is formed by the spectroscopic system must be as rectilinear as possible. As optical systems that meet such requirements, lenses and reflection converging mirrors are considered to be suitable.

In general, image formation by a reflection converging mirror is not strictly limited by the wavelength used, so that it can be used over a spectral range of from the ultraviolet region to the infrared region. However, if a converging mirror is used as an imaging element, it is necessary to adopt an off-axis optical system arrangement in which light is made incident at an angle to the normal (optical axis) of the converging mirror and the reflected light is taken out at an angle to the normal. Accordingly, when a converging mirror is used as an imaging element of high luminosity in a spectroscopic system, the off-axis angle becomes large inevitably because it is necessary to avoid interference between the entrance-side converging mirror (collimator mirror) and the diffraction-side converging mirror (imaging mirror). Therefore, if the entrance slit is high, the diffraction image is curved owing to the off-axis aberration and the diffraction by the diffraction grating. In other words, if a reflection converging mirror is used, luminosity and the rectilinearity of the spectral line image (slit image) are incompatible with each other. Since the spectral line image is curved by the off-axis arrangement when a reflection converging mirror is employed as an imaging system, as described above, it is necessary in order to obtain high luminosity and high dispersion to increase the focal length of the converging mirror instead of increasing the angle of incidence and the angle of diffraction. As a result, the spectroscopic system increases in size, so that, if the number of spectroscopic systems is increased to form a multi-stage spectral analyzer, the overall size increases more and more.

On the other hand, when a lens is employed as an imaging element, it need not be used in an off-axis state, so that the slit image is rectilinear. Moreover, a lens system that comprises a combination of optical glass lenses has the smallest f-number, and no reflecting mirror can match it in the light-gathering capability. More specifically, in the case of a lens, the solid angle for an extremely weak light emission point can be made as large as possible, and a spectral line image that is formed by the spectroscopic system can be made as rectilinear as possible. Optical lenses which are free from aberration and which have an f-number of 1 or less and a relatively long focal length (f=50 mm) or an f-number of the order of 2.8 and a long focal length (f=400 mm) are readily available at present. Accordingly, even if the angles of incidence and diffraction are increased, a rectilinear spectral line image can be obtained. Moreover, since the lens length of the imaging system is short, the spectroscopic system is smaller in size than that which employs a reflecting mirror, so that, even when a multi-stage spectral analyzer is formed, the overall size is relatively small.

For the above-described reasons, the present invention employs optical lenses having a small f-number as collimator and imaging systems, and a reflection diffraction grating as a spectroscopic system that diffracts parallel rays formed by the optical lens to produce spectra. In addition, a photon counting type or high sensitivity one- or two-dimensional photodetector that detects electrically a spectral intensity distribution image is disposed on an image plane where a spectral distribution image is formed through the diffraction grating and the imaging system, thereby simultaneously detecting light intensities at various wavelengths. When a transmission diffraction grating is employed in place of the reflection diffraction grating, it is impossible to realize a spectroscopic system of high diffraction efficiency; therefore, the transmission diffraction grating is inferior to the reflection diffraction grating in the spectral analysis of extremely weak radiation.

FIG. 1 shows a basic form of the high sensitive multi-wavelength spectral analyzer according to the present invention. The illustrated apparatus comprises a spectroscope 1 and a high sensitive one- or two-dimensional photodetector 6. The spectroscope 1 comprises an entrance slit 2 serving as an optical system that limits a measuring point on a sample S to a point or linear form, a collimator lens 3 with a small f-number which is disposed such that a focal point thereof is coincident with the entrance slit 2, to take in light emerging from the entrance slit 2 as much as possible and convert it into parallel rays, a reflection diffraction grating 4 which diffracts the parallel rays from the collimator lens 3 to produce spectra, and an imaging lens 5 that focuses the parallel rays diffracted by the reflection diffraction grating 4 on an image plane P to form a spectral image. The high sensitive one- or two-dimensional photodetector 6 is disposed on the image plane P where the spectral image is formed. The reflection diffraction grating 4 is arranged to be rotatable about the center C as shown by the arrows in the figure for adjustment of the detection spectral range.

In the spectral analyzer, extremely weak radiation from the sample S is diffracted in such a manner as to fulfill the relation:

$$\sin i + \sin \beta = m\lambda/d$$

where d is the grating interval of the reflection diffraction grating 4, i the angle of incidence to the reflection diffraction grating 4, $\beta$ the angle of diffraction from the reflection diffraction grating 4, $\lambda$ the wavelength, and m the order of diffraction.

Figure 2A:
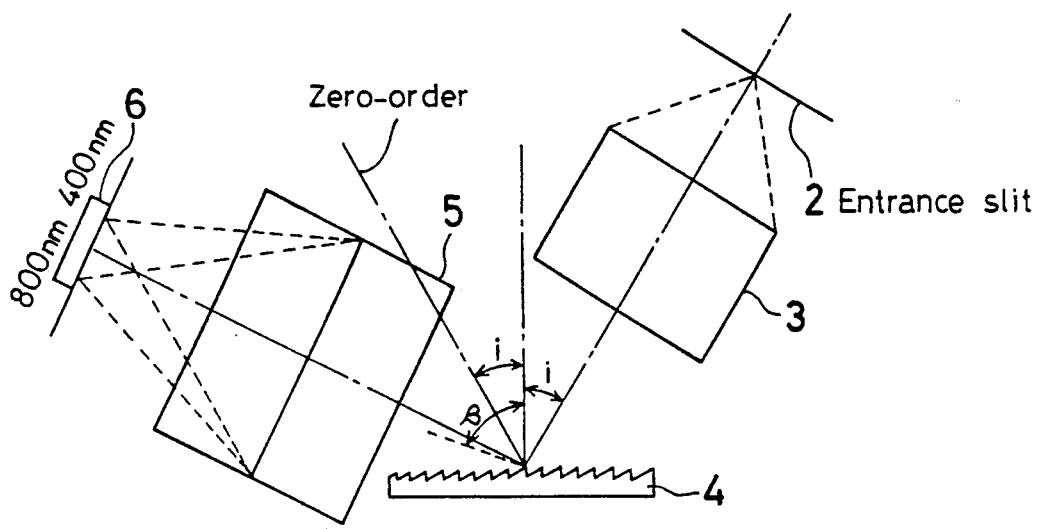
FIG. 2 shows the optical arrangements of two basic types of high sensitive multi-wavelength spectral analyzer shown in FIG. 1.
Figure 2B:
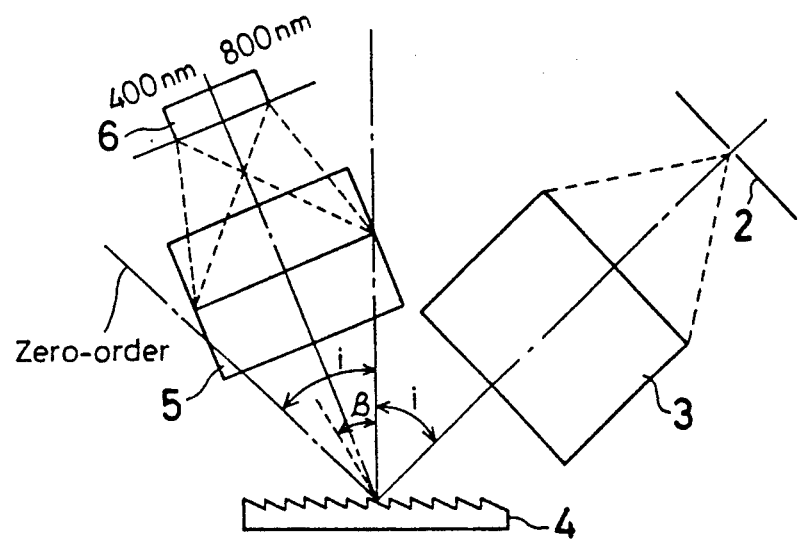

As a result, a spectral image is formed on the high sensitive one- or two-dimensional photodetector 6. Thus, by analyzing the output from the photodetector 6 to obtain coordinates of each point on the image and an image intensity at the point, it is possible to simultaneously measure spectral characteristics of extremely weak radiation from an object that produces bioluminescence, chemiluminescence, extremely weak fluorescence caused by excitation light, etc. Incidentally, there are two basic types, that is, a basic type (−first-order grazing incidence spectroscope) in which the imaging lens 5 and the high sensitive one- or two-dimensional photodetector 6 are disposed so as to fulfill the relation of m = −1 in the above equation, and another basic type (+first-order grazing incidence spectroscope) in which the imaging lens 5 and the high sensitive one- or two-dimensional photodetector 6 are disposed so as to fulfill the relation of m = +1 in the above equation. FIG. 2(a) shows the −first-order grazing incidence spectroscope, and FIG. 2(b) shows the +first-order grazing incidence spectroscope. In these cases, a blazed diffraction grating is employed as the reflection diffraction grating 4, and it is disposed as illustrated.

Let us consider the relationship between the apertures of the collimator lens 3 and the imaging lens 5 in the −first-order grazing incidence spectroscope shown in FIG. 2(a) and the +first-order grazing incidence spectroscope shown in FIG. 2(b). FIG. 3 is an optical path diagram for examination of the −first-order grazing incidence spectroscope. In the case where the optical axis of the imaging lens is coincident with the bisecting angle $\beta_{ce}$ of the short wavelength-side diffraction angle $\beta_a$ and the long wavelength-side diffraction angle $\beta_b$, $$D_i = l \cos i$$

$$D_o = l \cos \beta_{ce} + 2L\tan\Delta\beta, \quad \Delta\beta = \beta_a - \beta_{ce}$$

where $D_i$ is the diameter of the collimator lens 3, l the width of the diffraction grating 4, $\beta_{ce}$ the diffraction angle of the center wavelength, $D_o$ the diameter of the imaging lens 5, and L the distance from the center of the reflection diffraction grating 4 to the imaging lens 5.

In this type of spectroscope, the condition of $i < \beta_{ce}$ must be satisfied in order to allow light to reach the photodetector 6 effectively. Therefore, the diameter of the imaging lens 5 must be selected so as to satisfy the following condition:

$$D_i > D_o$$

Figure 3A:
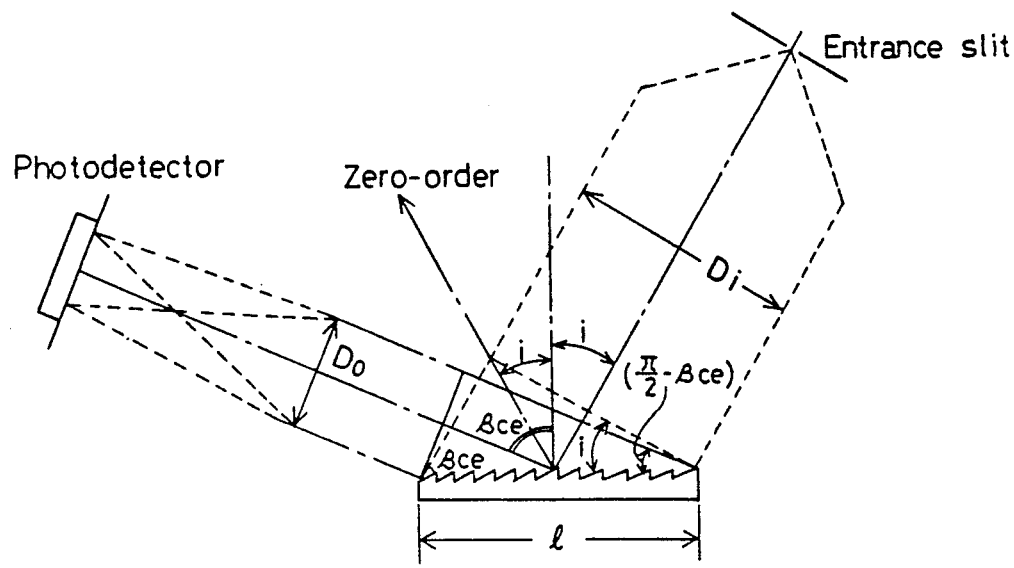
FIG. 3 shows optical path diagrams for examination of the basic types shown in FIG. 2.
Figure 3B:
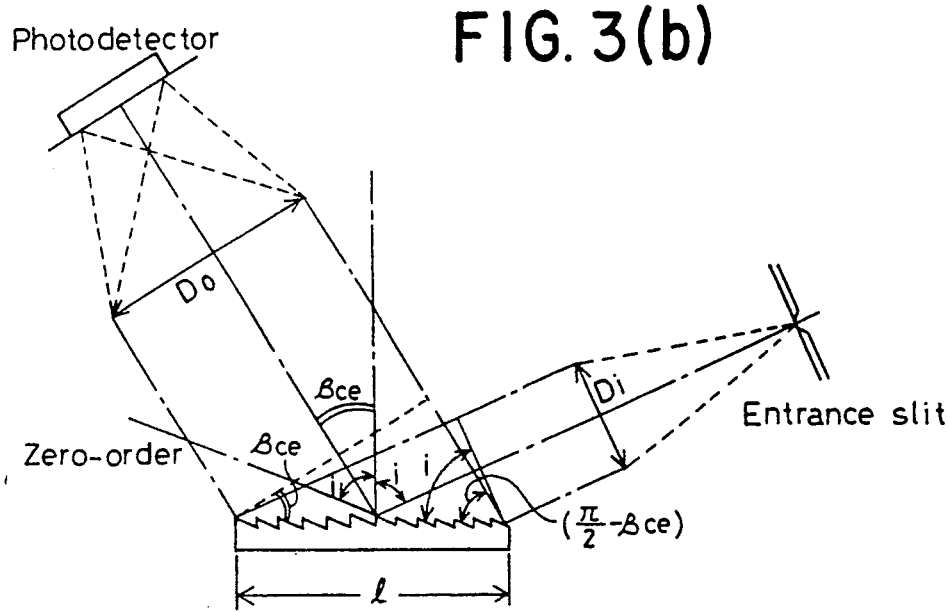

The +first-order grazing incidence spectroscope shown in FIG. 3(b) is examined in the same way to obtain $$D_i = l \cos i$$

$$D_o = l \cos \beta_{ce} + 2L\tan\Delta\beta, \quad \Delta\beta = \beta_b - \beta_{ce}$$

In this type of spectroscope, the condition of $i > \beta_{ce}$ must be satisfied in order to allow light to reach the photodetector 6 effectively. Therefore, the aperture of the imaging lens 5 must be selected so as to satisfy the following condition:

$$D_i < D_o$$

On the basis of the above examination, which spectroscope type is to be selected is considered in accordance with the kind of light which is to be subjected to spectral analysis. Since the −first-order grazing incidence spectroscope needs to dispose the blazed diffraction grating such that incident light strikes even on short diffraction surfaces, as shown in FIG. 3(a), diffracted light from the short diffraction surfaces becomes stray light, resulting in an increase in the background light. On the other hand, in the +first-order grazing incidence spectroscope the blazed diffraction grating is disposed such that no light is incident on the short diffraction surfaces. Therefore, stray light decreases, but the diameter of the imaging lens 5 needs to be larger than that of the collimator lens 3, as described above. However, in the high sensitive multi-wavelength spectral analyzer of the present invention, the collimator lens 3 has a small f-number and a diameter which is as large as possible; therefore, it is difficult to employ an imaging lens having a diameter larger than that of the collimator lens 3. Accordingly, if the +first-order grazing incidence spectroscope employs an imaging lens 5 which has a diameter as large as that of the collimator lens 3, the loss is large. Thus, the −first-order grazing incidence spectroscope is suitable for spectral detection of extremely weak spontaneous emission such as bioluminescence, chemiluminescence, etc. On the other hand, for the spectral detection of extremely weak fluorescence caused by excitation light, Raman scattered light, etc., in which stray light is a serious problem, the +first-order grazing incidence spectroscope, in which stray light does not conceal the signal light, is more suitable despite some loss of light. If it is possible to realize a desired aperture and f-number for each of the collimator and imaging lenses in the design of lenses, the +first-order grazing incidence spectroscope is more suitable even for spectral detection of extremely weak spontaneous emission such as bioluminescence, chemiluminescence, etc., as a matter of course.

To effect spectral analysis of light from the sample S by the high sensitive multi-wavelength spectral analyzer, the imaging lens 5 and the reflection diffraction grating 4 are disposed with the angle therebetween adjusted so that the center wavelength of diffracted light of proper order comes in the center of the high sensitive one- or two-dimensional photodetector 6, as described above, because the diffracted light emerging from the imaging lens 5 includes beams of light, e.g., −first-order diffracted light, +first-order diffracted light, etc., in addition to the zero-order diffracted light, as shown in FIG. 1. At this time, the geometrical optical light-receiving efficiency needs to be considered with the multiplex multi-wavelength spectroscope, although it need not be taken into consideration in the case of the conventional wavelength scanning system. More specifically, in the multiplex system, beams of light which are different in diffraction angle are condensed through the imaging lens to observe simultaneously all light in the observation wavelength region. Therefore, when the wavelength at the extremity of the observation wavelength region has a large angle difference with respect to the optical axis of the center wavelength, an eclipse due to the imaging lens 5 occurs, resulting in a lowering in the light-receiving efficiency. In order to minimize the lowering in the light quantity due to the eclipse, the distance from the center of the reflection diffraction grating 4 to the imaging lens 5 is shortened. The angle at which light from the collimator lens 3 is incident on the reflection diffraction grating 4 needs to be minimized in a range within which the required lens arrangement can be realized. The above-mentioned expression for the imaging lens represents the relationship between the minimum necessary aperture $D_o$ with respect to light incident on the lens and the distance L to the imaging lens.

Figure 4:
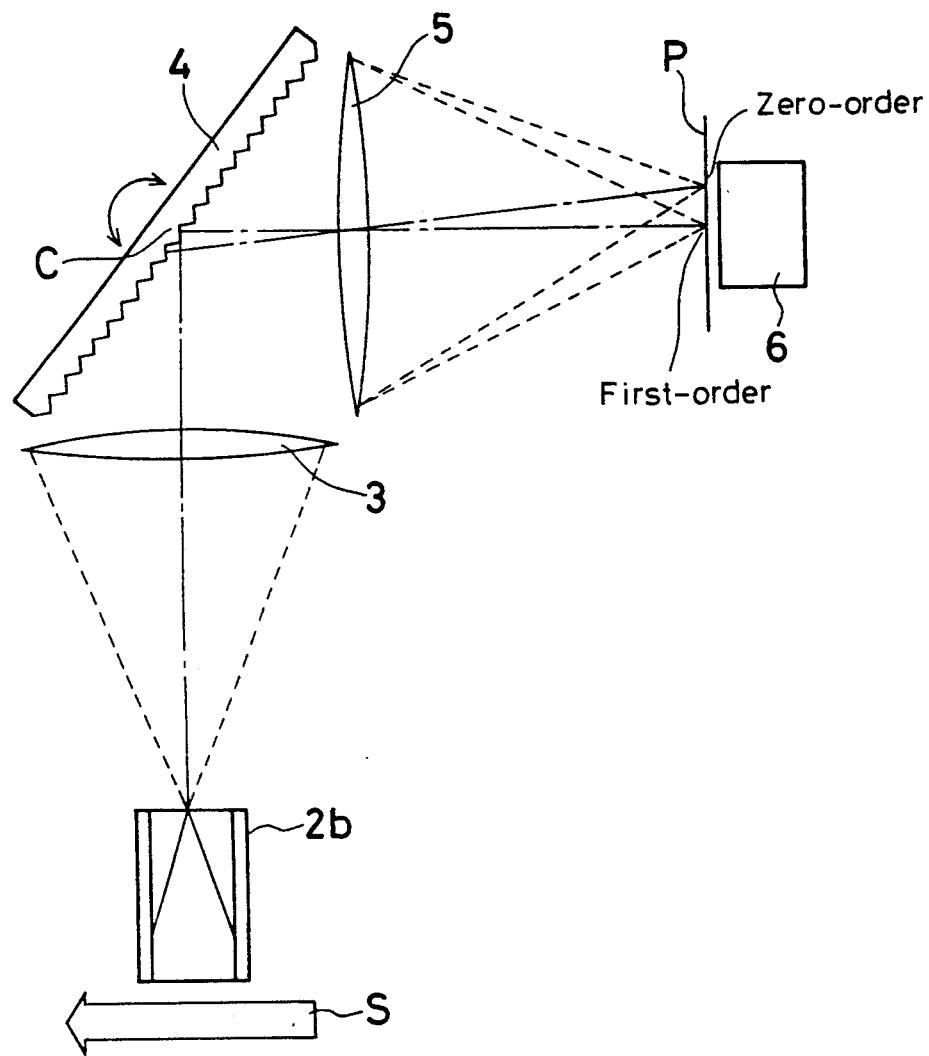
FIG. 4 shows the optical arrangement of another embodiment of the present invention.

As an optical system that limits a measuring point on the sample S to a point or linear form, the entrance slit 2 may be replaced with an optical element which can receive light from a sample or from a minute region or a relatively broad region of a sample image and emit light in the form of a point or linear beam. For example, an optical concentrator 2b that collects light from the sample S through an entrance window and emits it through a point or linear exit end may be employed as in the case of a high sensitive multi-wavelength spectral analyzer shown in FIG. 4. It is also possible to employ a pinhole.

Figure 5A:
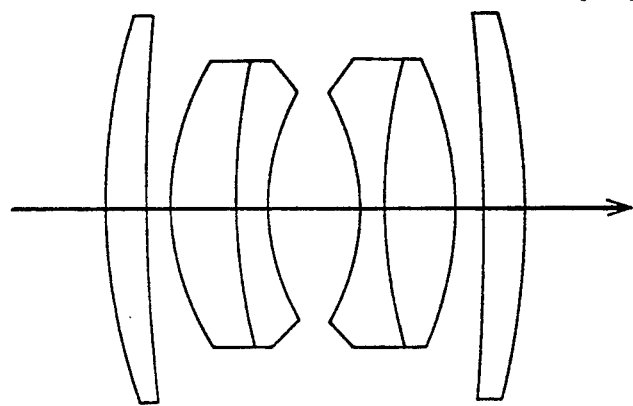
FIG. 5 shows exemplarily sectional structures of lenses with a small f-number, each comprising a plurality of spherical lenses.
Figure 5B:
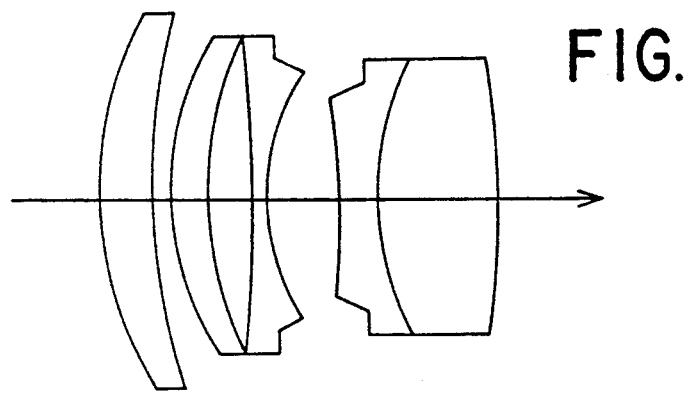

Although in the foregoing examples the collimator lens 3 and the imaging lens 5 each comprise a single lens, it is possible to employ a standard lens or a telephotographic lens, which has a small f-number and comprises a plurality of spherical lenses, as shown exemplarily in FIGS. 5(a) and 5(b). It is also possible to employ aspherical lenses or Fresnel lenses. The same is the case with embodiments described hereinbelow.

Figure 6A:
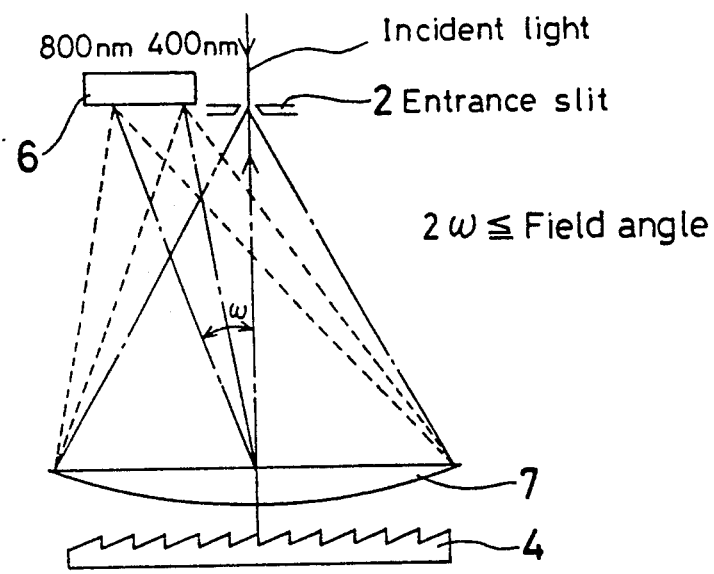
FIG. 6 shows the optical arrangements of modifications of the embodiment shown in FIG. 1.
Figure 6B:
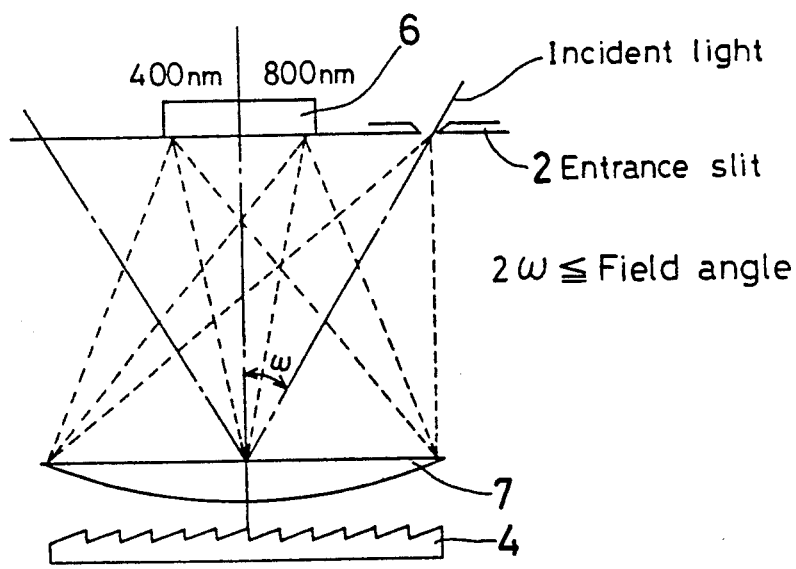

Incidentally, as a modification of the basic type shown in FIG. 1, the spectral analyzer may have a single lens which is designed to serve as both a collimator lens and an imaging lens. More specifically, as shown in FIG. 6(a), a collimator-imaging lens 7 having a small f-number is disposed parallel in front of the reflection diffraction grating 4, and the entrance slit 2 is disposed at a focal point of the lens 7, and further a high sensitive one- or two-dimensional photodetector 6 is disposed at a position where the diffracted light from the reflection diffraction grating 4 forms an image through the lens 7, thereby making light from the sample incident in the normal direction (normal incidence spectroscope). The respective positions of the entrance slit 2 and the high sensitive one- or two-dimensional photodetector 6 may be changed for each other so that light from the sample is made incident in an oblique direction (grazing incidence spectroscope), as shown in FIG. 6(b). Although in the illustrated arrangement the photodetector 6 is aligned with the center of the optical axis of the lens 7, it may be offset from the central position depending upon the entrance slit position and the observation wavelength region. The grazing incidence spectroscope, shown in FIG. 6(b), is easier in the disposition of the photodetector 6 than the normal incidence spectroscope, shown in FIG. 6(a).

Figure 7:
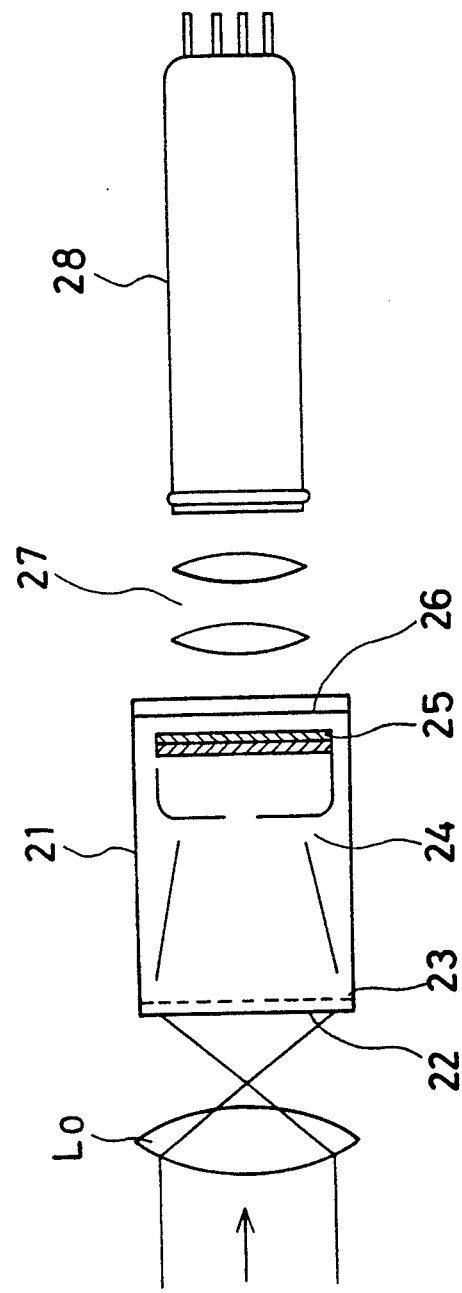
FIG. 7 is a sectional view of one example of a photodetector employed in the high sensitive multi-wavelength spectral analyzer of the present invention, which comprises a combination of a two-dimensional photon counting tube and a low-visual persistence vidicon.
Figure 8:
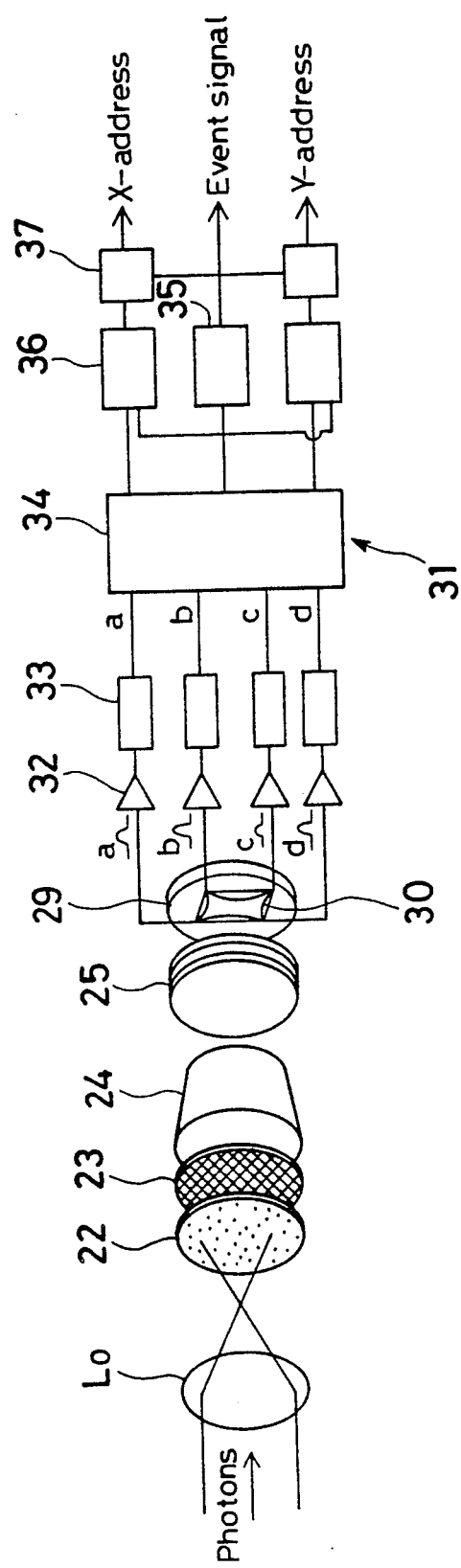
FIG. 8 is a sectional view of a photoncounting image acquisition system as another example of the photodetector employed in the present invention.

Examples of the photon counting type or high sensitive one- or two-dimensional photodetector 6 include a system (VIMS) comprising a combination of a two-dimensional photon counting tube and a low-visual persistence vidicon, as shown in FIG. 7, a photoncounting image acquisition system (PIAS) as shown in FIG. 8, a photodetector array comprising photodiodes arranged in the form of an array, a CCD, and a system wherein the light-receiving surface of such a photodetector is cooled to minimize noise so as to obtain high sensitivity.

Among them, VIMS and PIAS will be explained below briefly. Referring to FIG. 7, photons that are incident on a photoelectric surface 22 of a two-dimensional photon counting tube 21 are converted into photoelectrons, which then pass through a mesh 23 and an electron lens 24 to enter a two-stage microchannel plate (MCP) 25 where the photoelectrons are amplified and then strike on a fluorescent screen 26 as a plane of emergence to form bright dots. The bright dots are focused to a photoelectric surface of a low-visual persistence vidicon 28 through a lens system 27, thus allowing two-dimensional positions of the bright dots corresponding to the incident photons to be obtained as pulse signals from the output of the vidicon 28. Accordingly, by obtaining a distribution of the bright dots, a spectral distribuation image of extremely weak radiation can be obtained.

In the PIAS shown in FIG. 8, a section that comprises the photoelectric surface 22 to the MCP 25 has the same arrangement as that of the VIMS shown in FIG. 8 (though the MCP 25 in FIG. 8 is a three-stage MCP). Electron groups from the MCP 25 enter a silicon semiconductor position detector (PSD) 29 disposed at the back of the MCP 25, where they are further amplified by the electron bombardment effect and are then output from the PSD 29 in the form of pulse signals. The PSD 29 is an electric charge distribution type position detector having four signal output electrodes 30 on the periphery thereof, wherein electric charges produced inside the PSD 29 are distributed to the four electrodes 30 through a surface resistance layer in accordance with the positions where they are produced. As a result, signals corresponding to the barycentric positions of electron groups entering the PSD 29, that is, the bright dot positions, are obtained from the four electrodes 30. The pulse signals obtained from the PSD 29 are amplified in respective amplifiers 32 and then led to a position computing unit 31. By integrating these pulse signals in respective integrating circuits 33, an electric charge quantity from each electrode 30 is obtained. Next, the resulting signals are led to an adder-subtracter circuit 34 and then led to dividers 36 through a window gate 35, where they are converted to position signals, which are then AD converted in AD converters 37 before being output. By processing the output signals, a bright dot distribution is obtained. Thus, a spectral distribution image of extremely weak radiation is obtained. In FIGS. 7 and 8, reference numeral $L_o$ denotes an objective lens through which an image of incident photons (shown by the arrow) is formed on the photoelectric surface 12.

Figure 9A:
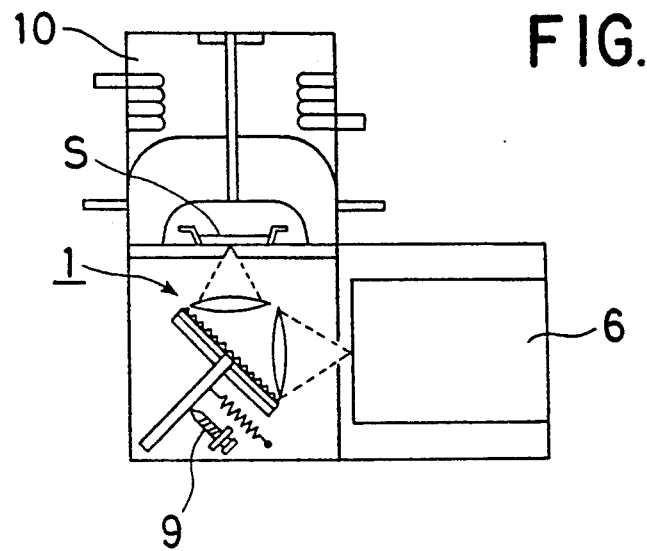
FIG. 9 is a sectional view of high sensitive multi-wavelength spectroscopic systems each incorporating the high sensitive multi-wavelength spectral analyzer of the present invention shown in FIG. 1.
Figure 9B:
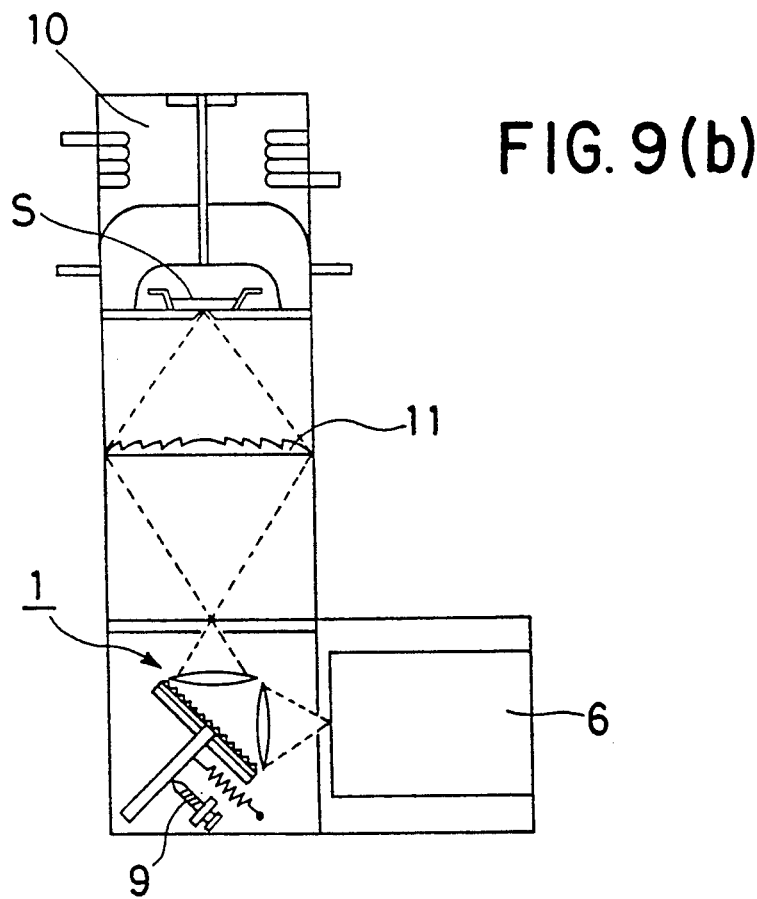

The following is a description of a high sensitive multi-wavelength spectroscopic system incorporating the high sensitive multi-wavelength spectral analyzer of the present invention, shown in FIG. 1. Referring to FIG. 9(a), the spectroscope 1 shown in FIG. 1 is disposed such that the entrance slit thereof is at the upper side, and a sample S is disposed in a sample chamber 10 with a temperature controller in such a manner that the sample S is in direct contact with the upper side of the slit, thereby detecting a spectral distribution image of an extremely weak radiation from the sample S with the high sensitive one- or two-dimensional photodetector 6. Reference numeral 9 in the figure denotes an angle adjusting mechanism for the diffraction grating of the spectroscope 1. FIG. 9(b) shows a high sensitive multi-wavelength spectroscopic system in which the sample S is not in direct contact with the spectroscope 1, but it is disposed to face the spectroscope 1 through a condenser lens 11. Although a Fresnel lens is employed as the condenser lens 11, it will be apparent that a normal spherical lens may be employed in place of it. However, when a luminous sample provides an exceedingly large area, the Fresnel lens 11 can be used as a lens that introduces only rectilinearly propagating light from the sample S instead of using it as an imaging lens, so that the quantity of light incident on the spectroscope can be increased, advantageously. As the condenser lens 11, it is necessary to employ a lens that has an f-number equal to or smaller than that of the collimator lens 3 in the spectroscope 1 so that the converging angle of light from the condenser lens 11 is not smaller than the light acceptance angle of the collimator lens 3. Although the spectroscopic systems shown in FIGS. 9(a) and 9(b) are arranged such that light that is emitted from the sample downwardly is received for spectral analysis, it will be apparent that, when light that is emitted from the sample upwardly or sidewardly is to be subjected to spectral analysis, the spectroscope 1 and the associated elements should be disposed in accordance with the direction of light from the sample.

Figure 10:
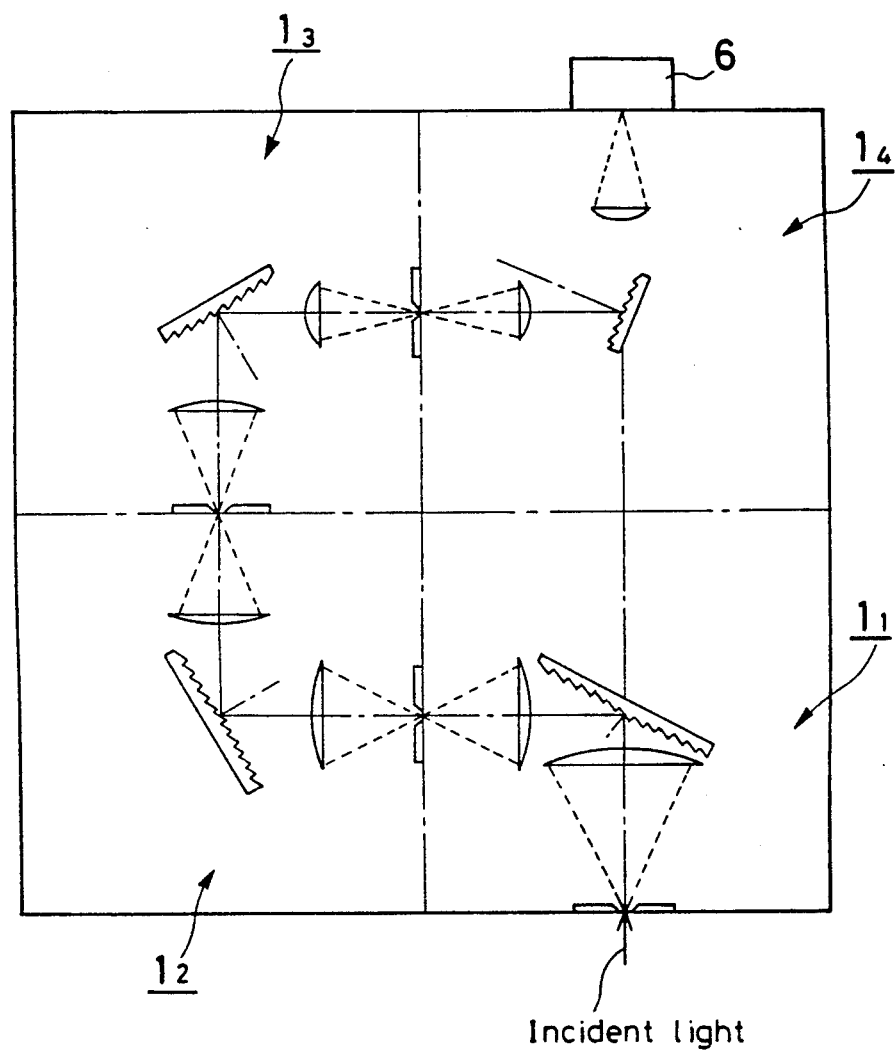
FIG. 10 shows the optical arrangement of one example of the multi-stage, high sensitive, multiplex multi-wavelength spectral analyzer according to the present invention.
Figure 11:
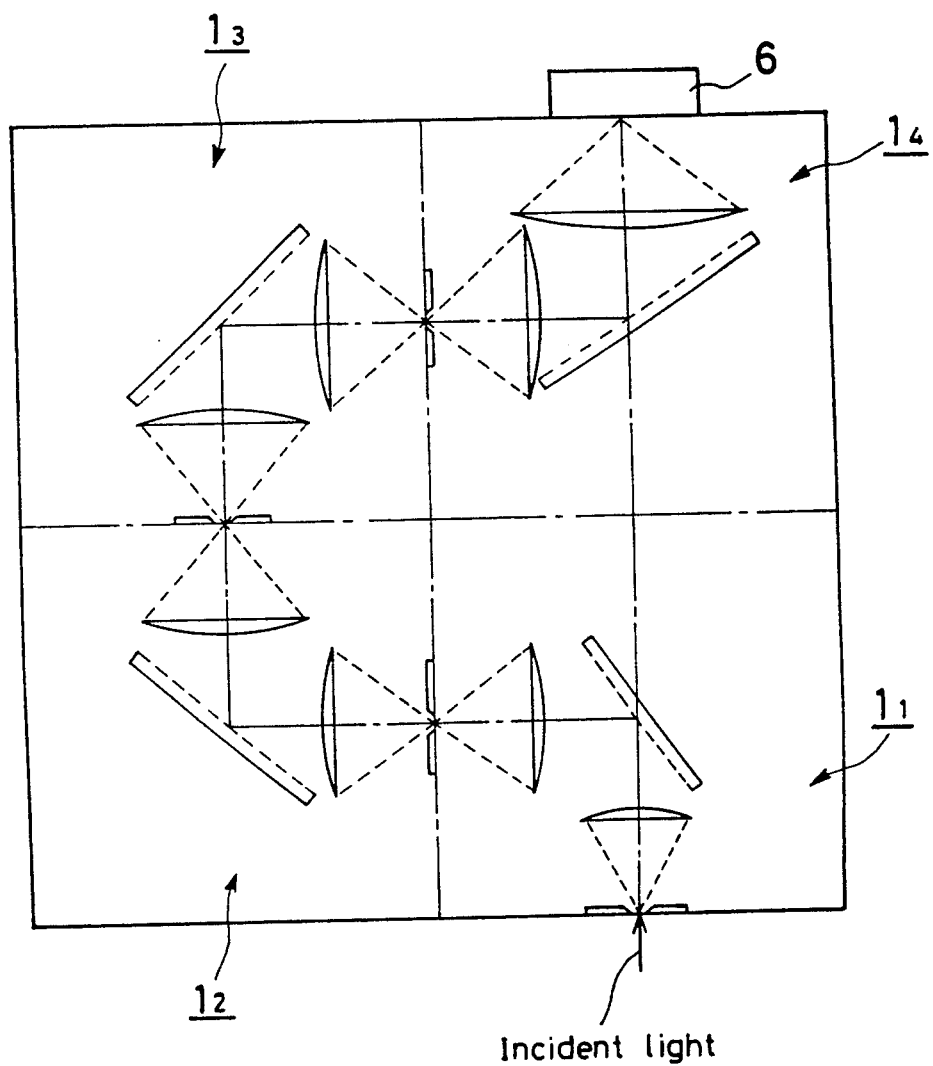
FIG. 11 shows the optical arrangement of another example of the multi-stage, high sensitive, multiplex multi-wavelength spectral analyzer according to the present invention.
Figure 12:
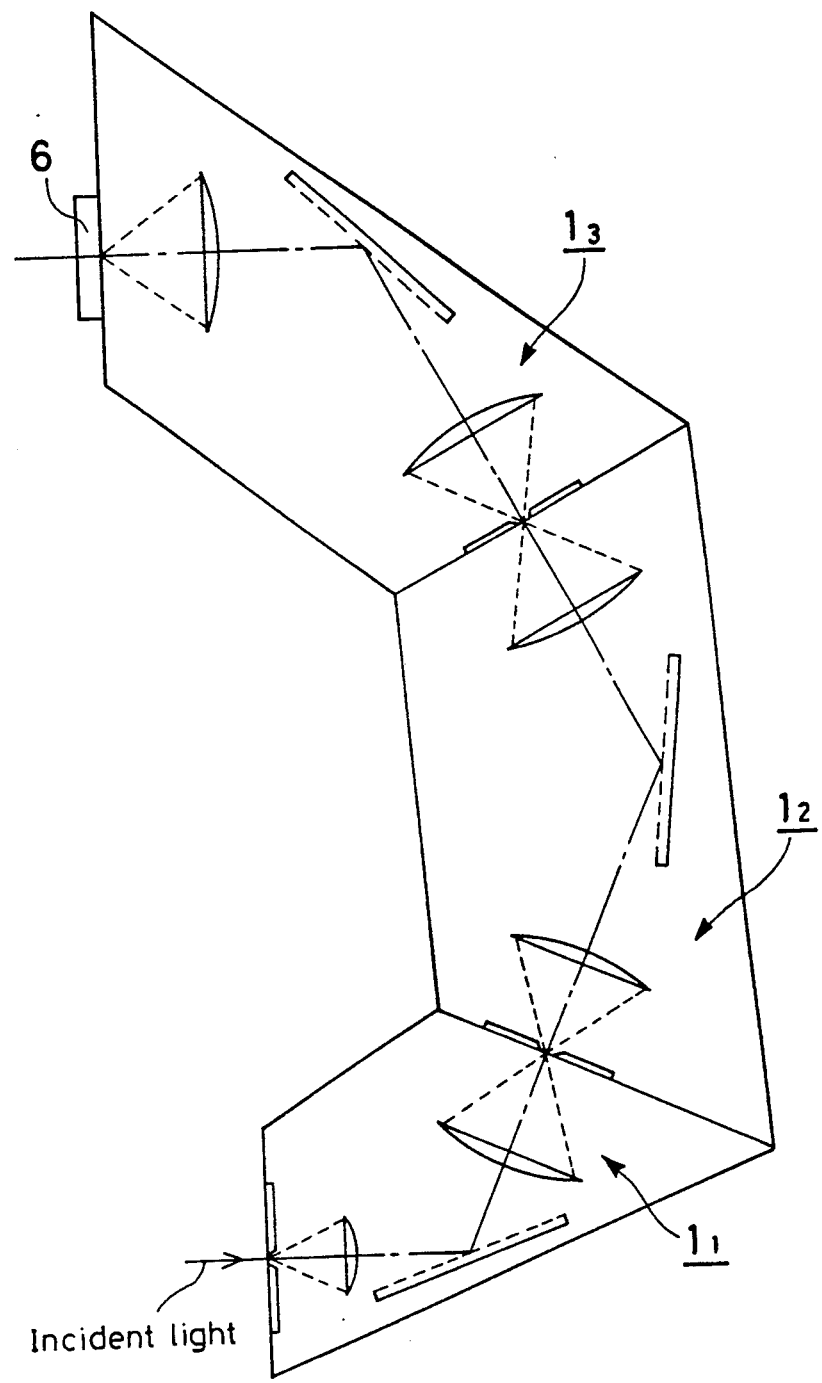
FIG. 12 shows the optical arrangement of still another example of the multi-stage, high sensitive, multiplex multi-wavelength spectral analyzer according to the present invention.

Although in the foregoing a single spectroscope is employed to form a high sensitive multi-wavelength spectral analyzer, the present invention is not necessarily limitative thereto. If spectroscopes are disposed in two or more stages to form an arrangement for additive dispersion to thereby control angular dispersion by using diffracted light a plurality of times, the overall resolving power can be improved. Such an arrangement is particularly effective when the wavelength difference between the excitation light and the Raman scattered light is small as in Raman spectroscopy. It is also possible to arrange spectroscopes in two or more stages for subtractive dispersion, as a matter of course. Examples of such multi-stage, high sensitive, multiplex multi-wavelength spectral analyzer according to the present invention are shown in FIGS. 10 to 12. FIG. 10 shows a multi-stage spectral analyzer wherein four −first-order grazing incidence spectroscopes $1_1$ to $1_4$, shown in FIG. 2(a), are arranged in series in the shape of a square as a whole. FIG. 11 shows a multi-stage spectral analyzer wherein four +first-order grazing incidence spectroscopes $1_1$ to $1_4$, shown in FIG. 2(b), are arranged in series in the shape of a square as a whole. FIG. 12 shows a multi-stage spectral analyzer wherein three +first-order grazing incidence spectroscopes $1_1$ to $1_3$ are arranged in series. It should be noted that the number of stages is not necessarily limited to those described above. It is also possible to combine together the −first-order grazing incidence type of spectroscope and the +first-order grazing incidence type of spectroscope.

Figure 13:
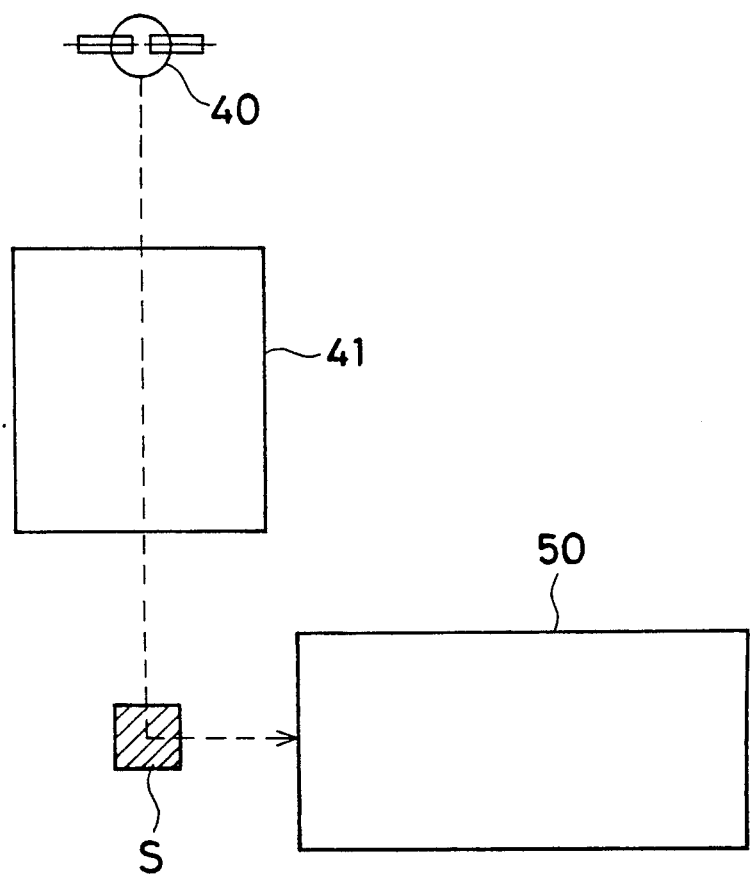
FIG. 13 is a conceptual view of a system for spectral analysis of fluorescence or Raman scattered light from a sample of ordinary size.

With the high sensitive multi-wavelength spectral analyzer described above, it is possible to effect spectral analysis of extremely weak radiation such as fluorescence, Raman scattered light, etc. A system for spectral analysis of such extremely weak radiation will be explained below. FIG. 13 is a conceptual view of a system for spectral analysis of fluorescence or Raman scattered light from a sample S of ordinary size. Light from an excitation light source 40 is passed through a spectroscope 41 for excitation to take out excitation light of a desired wavelength, and the sample S is irradiated with the excitation light. Fluorescence or Raman scattered light from the sample S is incident on a high sensitive multi-wavelength spectral analyzer 50 employing lenses according to the present invention to effect simultaneous, multi-wavelength spectral analysis. In the case of analysis of fluorescence, a high sensitive multi-wavelength spectral analyzer 50 comprising a single spectroscope suffices in general. However, in spectral analysis of Raman scattered light, since the wavelength difference between excitation light and stray light is small, it is necessary to employ a high sensitive multi-wavelength spectral analyzer 50 comprising spectroscopes arranged in a multi-stage structure, as shown in FIGS. 10 to 12, which provides high wavelength resolution (the same is the case with microspectroscopic analysis shown below). When a laser is employed as the excitation light source 40, no spectroscope 41 for excitation is needed.

Figure 14:
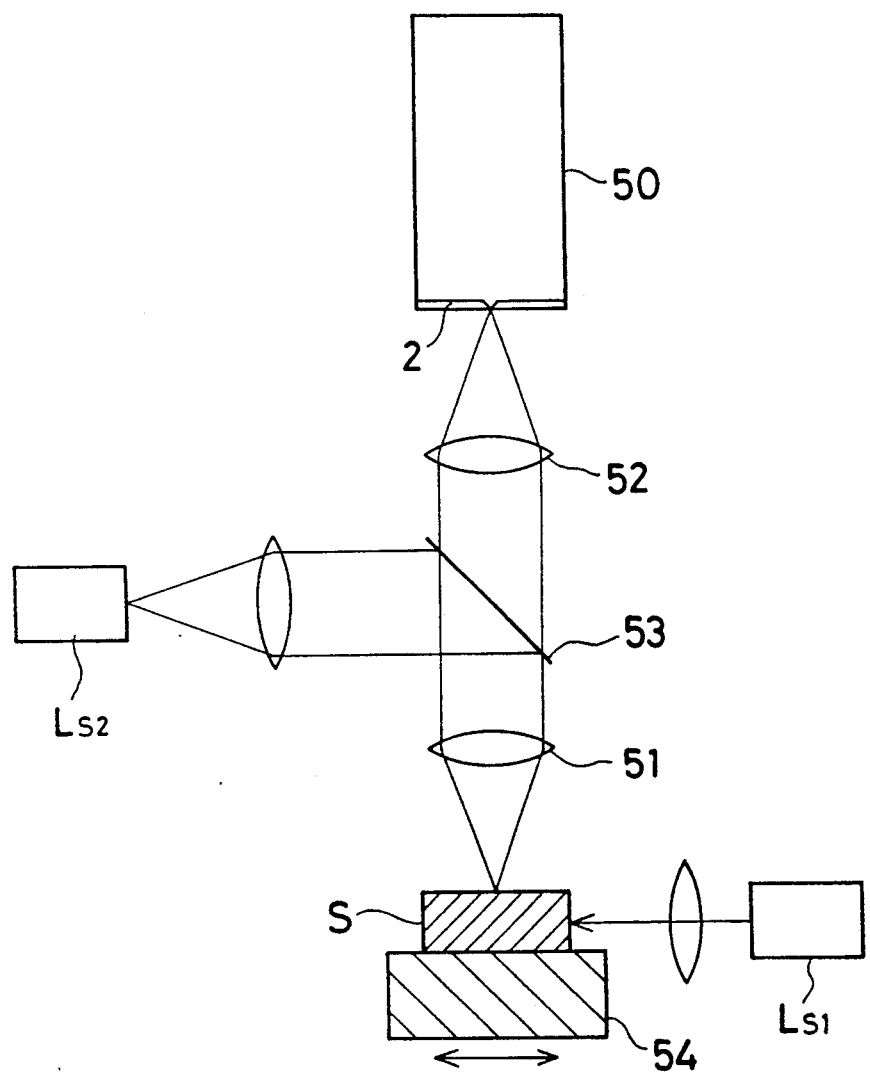
FIG. 14 is a conceptual view of a microspectroscopic system for fluorescence or Raman scattered light.

To effect spectral analysis of extremely weak radiation such as fluorescence, Raman scattered light, etc. from a minute sample, a microspectroscopic system such as that shown in FIG. 14 is employed, whereby it is possible to realize simultaneous multi-wavelength spectral analysis of high luminosity that utilizes the advantageous features of the high sensitive multi-wavelength spectral analyzer 50 according to the present invention. In the prior art, even if lenses having a small f-number are employed as an objective lens 51 and an imaging lens 52, since the f-number of the lens system in the spectroscope 50 is large, the luminosity of the spectroscope determines the sensitivity limit. However, employment of the high sensitive multi-wavelength spectral analyzer of the present invention makes it possible to realize microspectroscopic analysis of fluorescence of the order of $f=1$ and microspectroscopic analysis of Raman scattered light of the order of $f=2.8$. More specifically, fluorescence or Raman scattered light from a sample S excited by light from an excitation light source $L_{s1}$ or $L_{s2}$ is converted to parallel rays through an objective lens 51 having a small f-number and then focused onto the entrance slit 2 of the high sensitive multi-wavelength spectral analyzer 50 of the present invention through a second positive (imaging) lens 52 having the same f-number as that of the objective lens 51. Thus, since fluorescence or Raman scattered light from the sample S is taken in with a large solid angle by using the objective and imaging lenses 51 and 52 having a small f-number and it reaches the high sensitive multi-wavelength spectral analyzer 50, it is possible to effect spectral analysis of high luminosity in the high sensitive multi-wavelength spectral analyzer 50. It should be noted that the f-number of the collimator lens in the high sensitive multi-wavelength spectral analyzer 50 is equal or as close to the f-number of the objective and imaging lenses 51 and 52 as possible. If the f-number of the objective and imaging lenses 51 and 52 is larger than that of the collimator lens, part of the light is lost (i.e., if the f-number of the objective lens 51 is excessively large, there will be a loss of the quantity of light taken in from the emission point on the sample S; if the f-number of the imaging lens 52 is excessively large, the image of the emission point on the sample S that is formed on the entrance slit 2 is enlarged excessively, so that the image is partially cut off by the slit 2, resulting in a loss). In such a case, the high luminosity of the high sensitive multi-wavelength spectral analyzer 50 cannot be utilized to the full. In FIG. 14, reference numeral 53 denotes a dichroic mirror that directs light from the excitation light source $L_{s2}$ to the sample S and passes fluorescence or Raman scattered light from the sample S, and 54 a sample scanning mechanism that scans the sample S to change analyzing points successively.

Incidentally, the light-transmitting characteristics of a lens are limited by the glass medium thereof. In general, there are a large number of different kinds of glass whose light-transmitting characteristics are excellent in the visible region, whereas there are a relatively small number of kinds of glass whose light-transmitting characteristics are excellent in the near infrared region and the infrared region. Accordingly, a high-sensitive spectroscope that is designed mainly for the visible region can use lenses of high luminosity. Since spectral analysis of fluorescence and Raman scattered light is generally carried out in the visible region, the high sensitive multi-wavelength spectral analyzer of the present invention is also considered to be suitable from this point. It should be noted that the high sensitive multi-wavelength spectral analyzer of the present invention can also be employed for absorption spectroscopy and reflection spectroscopy in addition to spectral analysis of luminescence, fluorescence and Raman scattered light, as a matter of course.

Advantages of the multiplex method by the high sensitive multi-wavelength spectral analyzer according to the present invention over the wavelength scanning method by a monochromator will be briefly explained below.

The multiplex method has two advantages, that is, observation time and reduction of dark noise.

Assuming that observation time is T when multiplex spectroscopy is carried out for a wavelength region W with a detector having a size L and N pixels and with a wavelength resolution R, observation time for each pixel is T, and observation time per wavelength resolution is also T. In contrast, in a case where the same wavelength region is measured with the same resolution by the wavelength scanning method, when the wavelength region W is scanned with time T, the observation time per wavelength resolution is T·R/W because only light of a wavelength width coming out of the exit slit (the resolution is determined by the wavelength width of the exit slit) is observed. Accordingly, from the viewpoint of the observation time, the multiplex method makes it possible to expect W/R-fold improvement over the wavelength scanning method.

Dark noise is considered to be proportional to the area of the light-receiving surface. Assuming that the two methods use detectors having the same light-receiving surface area, in the case of the multiplex method light of a certain wavelength arrives at a place on the light-receiving surface of the detector that is equivalent to the resolution wavelength width. Accordingly, for dark noise that is equivalent to light of this wavelength, it is only necessary to consider dark noise in a place where light arrives. Assuming that dark noise generated in the whole area of the light-receiving surface of the detector is D, dark noise that is equivalent to the resolution wavelength width is D·R/W. In contrast, in the wavelength scanning method, D is constant for each wavelength independently of resolution because of use of a single-channel detector.

In other words, the present invention has the advantages of the multiplex method in regard to both the observation time and the reduction of dark noise and enables a great improvement in sensitivity, particularly in the high-resolution region.

The following is a comparison as to S/N ratio between the two methods. Assuming that energies per resolution in the two methods are $I_m$ and $I_s$, signal generation probabilities at the respective detectors are $P_m$ and $P_s$, and counts of dark noises generated on the whole areas of the photoelectric surfaces of the detectors are $D_m$ and $D_s$, the signal quantity ($N_s$), dark noise quantity ($N_d$) and observation time per resolution in the multiplex method are given by Signal quantity $(N_s) = P_m \cdot I_m$
Dark noise quantity $(N_d) = D_m \cdot (R/W)$
Observation time/resolution $= T$ The signal quantity ($N_s$), dark noise quantity ($N_d$) and observation time per resolution in the wavelength scanning method are given by Signal quantity $(N_s) = P_s \cdot I_s$
Dark noise quantity $(N_d) = D_s$
Observation time/resolution $= T(R/W)$ Assuming that W/R=M, where M is the number of spectral elements, the S/N ratio $(S/N)_m$ of the multiplex method and the S/N ratio $(S/N)_s$ of the wavelength scanning method are given by $(S/N)_m = P_m \cdot I_m \cdot T^{\frac{1}{2}}/(P_m \cdot I_m + D_m/M)^{\frac{1}{2}}$ $(S/N)_s = P_s \cdot I_s \cdot (T/M)^{\frac{1}{2}}/(P_s \cdot I_s + D_s)^{\frac{1}{2}}$ Accordingly, assuming that the two methods use identical spectroscopes and are equal in the detector characteristics, $I_m = I_s$, $P_m = P_s$, and $D_m = D_s$. Thus, the following conclusion is drawn in regard to the ratio between the S/N ratios of the two methods:

$N_s \gg N_d$ (when photon noise is dominant)
$(S/N)_m/(S/N)_s = M^{\frac{1}{2}}$
$N_s = N_d$ (when photon noise and detector noise are equal to each other)
$(S/N)_m/(S/N)_s = 2^{\frac{1}{2}} M/(M+1)^{\frac{1}{2}}$
$N_s \ll N_d$ (when detector noise is dominant)
$(S/N)_m/(S/N)_s = M$ Accordingly, the multiplex method by the high sensitive multi-wavelength spectral analyzer of the present invention makes it possible to expect at least $M^{\frac{1}{2}}$-fold improvement in sensitivity over the wavelength scanning method by the monochromator.

Figure 15:
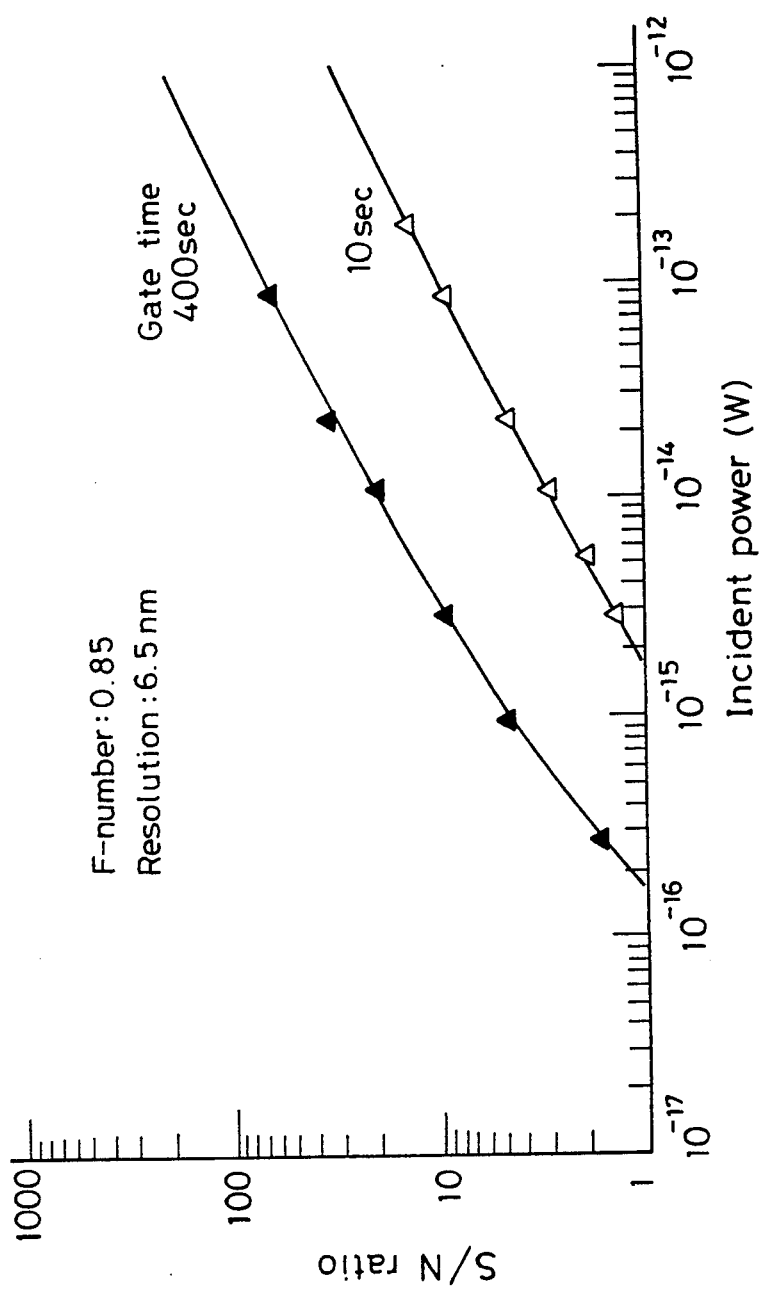
FIG. 15 is a graph showing measured values for the sensitivity performance of the high sensitive multi-wavelength spectral analyzer according to the present invention.

FIG. 15 shows measured values for the sensitivity performance of a high sensitive multi-wavelength spectral analyzer constructed on a trial basis according to the present invention. Measurement was carried out by using light of 546 nm among the emission lines of mercury with a resolution of 6.5 nm. The entrance slit width was 200 μm, and the height was 10 mm. A detector comprising a combination of a two-dimensional photon counting tube and a low-visual persistence vidicon, as shown in FIG. 7, was employed. As will be clear from the graph of FIG. 15, the minimum detectable signal was $10^{-15}$ W at a gate time of 10 sec, and $10^{-16}$ W at a gate time of 400 sec. In the prior art, the minimum detectable signal is $10^{-12}$ W at best. From this point, the high sensitivity of the high sensitive multi-wavelength spectral analyzer of the present invention will be understood.

Thus, the high sensitive multi-wavelength spectral analyzer of the present invention has the optical system 2 that limits incident light to a point or linear beam, the collimator lens 3 having a small f-number, the reflection diffraction grating 4, the imaging lens 5 having a small f-number, and the photon counting type or high sensitive one- or two-dimensional photodetector 6, and it realizes the following excellent effects in spectral analysis of extremely weak radiation from the sample S, such as bioluminescence, chemiluminescence, extremely weak fluorescence caused by excitation light, Raman scattered light, etc. More specifically, the optical system 2, which limits incident light to a point or linear beam, causes light from the sample S to enter the collimator lens 3 as a point or linear light source, and the collimator lens 3 converts the light from the sample S into parallel rays of high parallelism and allows all the parallel rays to enter the reflection diffraction grating 4. Accordingly, the reflection diffraction grating 4 can display its resolving power to the full and effectively diffract extremely weak light to produce spectra. In addition, the collimator lens 3 and the imaging lens 5 can be disposed in close proximity to the reflection diffraction grating 4 and need not be used in an off-axis state, so that all the incident light can be utilized effectively for high resolution, simultaneous, multi-wavelength spectral analysis, and it is possible to realize a reduction in the overall size of the apparatus. The most important effect is that since lenses having an f-number as small as possible can be used as the collimator lens 3 and the imaging lens 5, the light-gathering capability of the apparatus, which is determined by the two lenses, can be increased satisfactorily. By combining the spectroscope with the photon counting type or high sensitive one- or two-dimensional photodetector 6, it becomes possible to effect simultaneous multi-wavelength analysis of extremely weak radiation such as bioluminescence, chemiluminescence, extremely weak fluorescence caused by excitation light, Raman scattered light, etc., which has heretofore been difficult to realize. Thus, the spectral analyzer of the present invention is useful as a means for researching living organisms and trace components by use of bioluminescence, chemiluminescence, extremely weak fluorescence caused by excitation light, Raman scattered light, etc.

What is claimed is:

1. A high sensitive multi-wavelength spectral analyzer for spectral detection of extremely weak emission of bioluminescence or chemiluminescence comprising:

a spectroscope including an optical system that limits incident light, a collimator lens disposed such that a focal point of said collimator lens is coincident with an end of said optical system, to convert light emerging from said end into parallel rays, a reflection diffraction grating that diffracts the parallel rays from said collimator lens to produce spectra, and an imaging lens that focuses the parallel rays diffracted by said reflection diffraction grating on an image plane thereof to form a spectral image; and a high sensitivity photodetector selected from the group consisting of a one-dimensional photodetector and a two-dimensional photodetector, the high sensitivity photodetector disposed on the image plane of said imaging lens such that an observation wavelength region is within a detecting surface thereof;

wherein said imaging lens and said high sensitivity photodetector are disposed such that the optical axis of said imaging lens is coincident with a bisecting angle of a short wavelength-side diffraction angle and a long wavelength-side diffraction angle of the observation wavelength region and said optical axis is substantially coincident with a center of the detecting surface of said photodetector; and said reflection diffraction grating is a blazed diffraction grating, and said collimator lens has a larger diameter than that of said imaging lens, means for taking out as a spectral image —first-order diffracted light for minimizing the loss of incident light to a larger extent than that to which stray light is minimized, said taking out means comprising said collimator lens, said blazed diffraction grating and said imaging lens.

2. A high sensitive multi-wavelength spectral analyzer for spectral detection of Raman scattered light or fluorescence caused by excitation light, comprising:

a spectroscope including an optical system that limits coincident light, a collimator lens disposed such that a focal point of said collimator lens is coincident with an end of said optical system, to convert light emerging from said end into parallel rays, a reflection diffraction grating that diffracts the parallel rays from said collimator lens to produce spectra, and an imaging lens that focuses the parallel rays diffracted by said reflection diffraction grating on an image plane thereof to form a spectral image; and a high sensitivity photodetector selected from the group consisting of a one-dimensional photodetector and a two-dimensional photodetector, the high sensitivity photodetector disposed on the image plane of said imaging lens such that an observation wavelength region is within a detecting surface thereof, wherein said imaging lens and said high sensitivity photodetector are disposed such that the optical axis of said imaging lens is coincident with a bisecting angle of a short wavelength-side diffraction angle and a long wavelength-side diffraction angle of the observation wavelength region and said optical axis is substantially coincident with a center of the detecting surface of said photodetector; and said reflection diffraction grating is a blazed diffraction grating, and said collimator lens has a larger diameter than that of said collimator lens, means for taking out as a spectral image —first-order diffracted light for minimizing stray light to a larger extent than to which the loss of incident light is minimized, said taking out means comprising said collimator lens, said blazed diffraction grating and said imaging lens.

3. A high sensitive multi-wavelength spectral analyzer according to claims 1 or 2, wherein said optical system is a slit.

4. A high sensitive multi-wavelength spectral analyzer according to claims 1 or 2, wherein said optical system receives light from a sample and emits light in the form of a point.

5. A high sensitive multi-wavelength spectral analyzer according to claims 1 or 2, wherein a plurality of spectroscopes are disposed in a multi-stage structure for dispersion to thereby control angular dispersion by using diffracted light a plurality of times.

6. A high sensitive multi-wavelength spectral analyzer according to claim 5, wherein the plurality of spectroscopes are of the same type.

7. A high sensitive multi-wavelength spectral analyzer according to claims 1 or 2, further comprising a first positive lens having a smaller f-number than that of said collimator lens, said first positive lens converting light from a spectral analysis point on a sample into substantially parallel rays, and a second positive lens having a smaller f-number than that of said collimator lens, said second positive lens focusing said parallel rays onto said optical system.

8. A high sensitive multi-wavelength spectral analyzer according to claims 6, further comprising a scanning mechanism, wherein the spectral analysis point on the sample is scanned by the scanning mechanism with respect to a front focal point of said first positive lens.

9. A high sensitive multi-wavelength spectral analyzer according to claims 1 or 2, wherein the optical system limits the incident light to a point, and the collimator lens is disposed such that the focal point of the collimator lens is coincident with a point at the end of the optical system.

10. A high sensitive multi-wavelength spectral analyzer according to claims 1 or 2, wherein the optical system limits incident light to a linear beam, and the collimator lens is disposed such that the focal point of the collimator lens is coincident with a linear exit end of the optical system.

11. A high sensitive multi-wavelength spectral analyzer according to claims 1 or 2, wherein the optical system is a pinhole.

12. A high sensitive multi-wavelength spectral analyzer according to claims 1 or 2, wherein said optical system receives light from a sample and emits light in the form of a linear beam.

* * * * *